July 9, 1957 R. C. FERGASON 2,798,353
SPINDLE POSITIONING AND STRIPPING MECHANISM FOR COTTON PICKERS
Original Filed Sept. 10, 1949 3 Sheets-Sheet 1
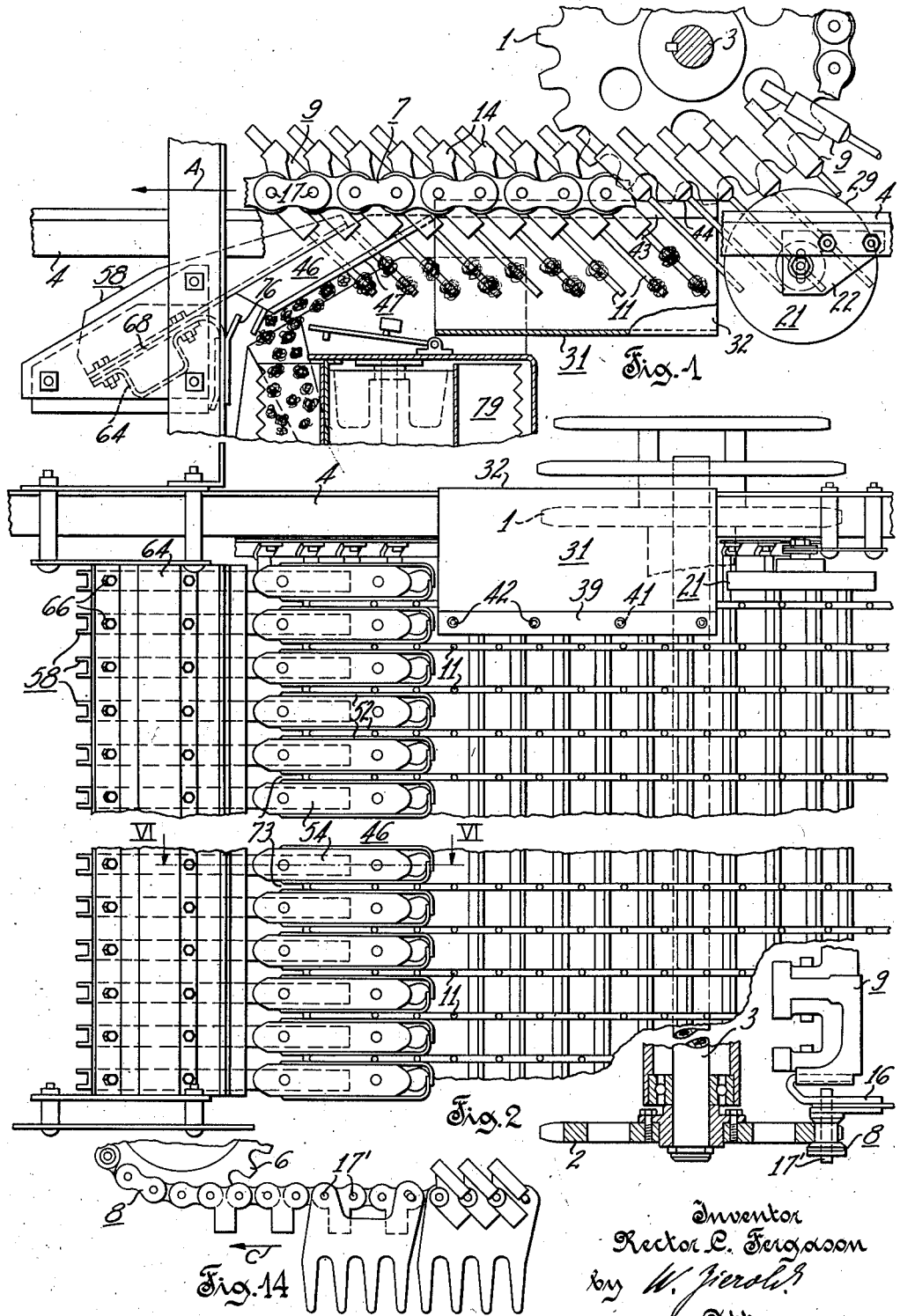
Inventor
Rector C. Fergason
by W. Jierolf
Attorney

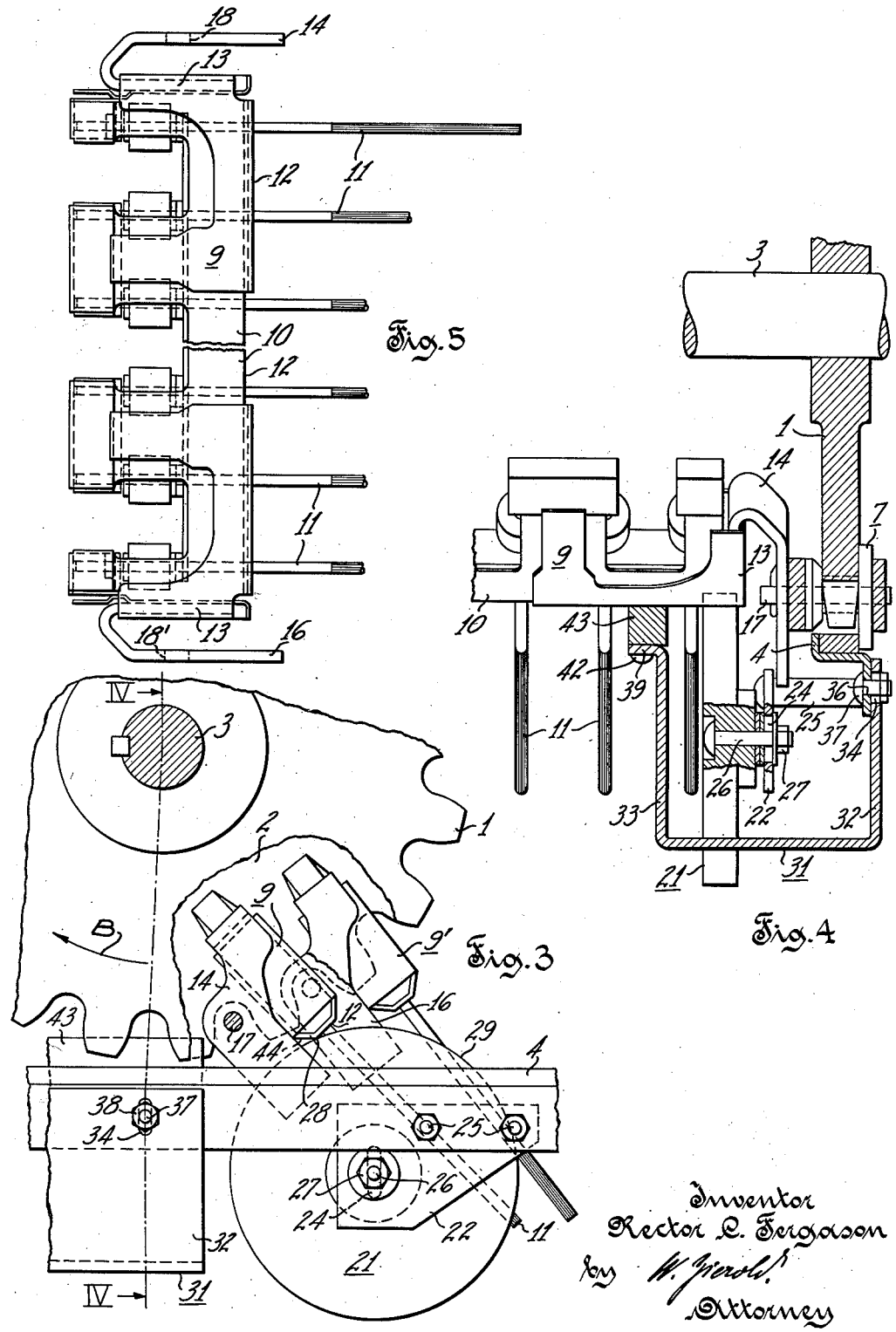

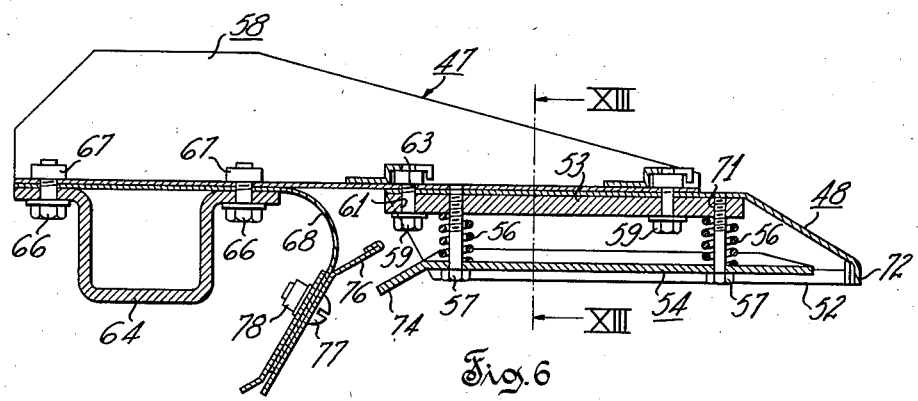
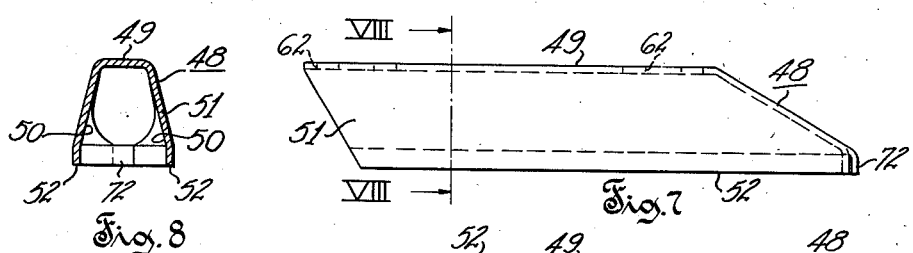
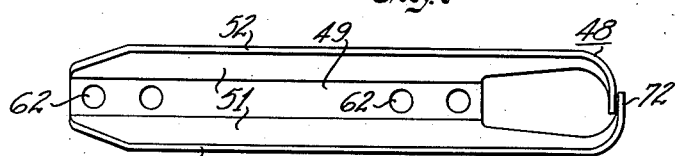
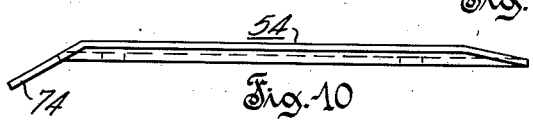
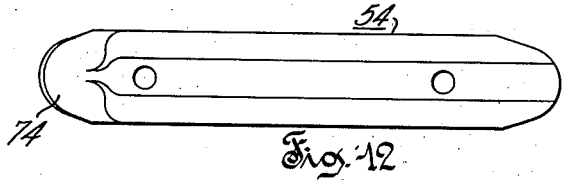
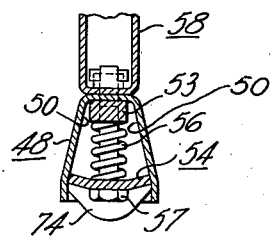

United States Patent Office 2,798,353
Patented July 9, 1957

2,798,353

SPINDLE POSITIONING AND STRIPPING MECHANISM FOR COTTON PICKERS

Rector C. Fergason, Gadsden, Ala., assignor to Allis-Chalmers Manufacturing Company, Milwaukee, Wis.

Original application September 10, 1949, Serial No. 114,969. Patent No. 2,671,298, issued March 9, 1954. Divided and this application February 16, 1954, Serial No. 410,481

21 Claims. (Cl. 56—42)

This invention relates to cotton harvesters, and it is concerned more particularly with a mechanism for positioning and stripping the spindles of a rotary spindle type cotton picking machine. This application is a division of application Serial No. 114,969, filed September 10, 1949 and now Patent 2,671,298 for Cotton Picker.

Cotton picking machines of the rotary spindle type have heretofore been known wherein the spindles are mounted on vertical slats and wherein a series of such slats are pivotally connected at their opposite ends to a pair of top and bottom chains which are driven in an oval path about a set of drive sprockets at one end and about a set of idlers at the other end of such path. Each slat mounts a vertical series of horizontally extending picking spindles, and provisions are made for causing rotation of the spindles on their axes while they are moved through a picking tunnel by continuous travel of the chains and slats about the drive sprockets and idlers. The direction in which the chains and slats are driven is such that the spindles move through the picking tunnel in a rearward direction, and when the loaded spindles emerge from the picking tunnel they pass around the rear end of the oblong path of chain travel and then outside of the picking tunnel in a forward direction. During such forward travel of the spindles they are passed through a stationary comb like assembly of stripping shoes, so that the cotton lint which has been wound on the spindles during their rearward passage through the picking tunnel will be removed from the spindles during their forward passage through the stripping mechanism.

In spindle type cotton picking machines of the above outlined character and as heretofore constructed the passage of the spindles through the gaps between the stripping shoes during normal operation of the machine causes wear of the stripping shoes and spindles. Such wear has been the source of considerable difficulties, primarily because of the widening of the gaps between adjacent shoes which permits the spindles to pass through the gaps with some of the cotton fibers still attached. The resulting incomplete stripping of the spindles reduces the picking efficiency of the machine, as is well known in the art.

Another problem encountered in picking machines of the general type outlined hereinabove, is the positioning of the spindle slats, and spindles thereon, in proper angular relation to the stripper comb assembly preparatory to the passage of the spindles through the gaps between the stripping shoes. Guides arranged for cooperation with the spindles so as to cause the slats to turn on their pivot mountings have heretofore been suggested for that purpose, but such guides as heretofore used have not been found to be entirely satisfactory, particularly in the matter of reasonable wear resistance and dependable operation.

The principal object of the present invention is to provide an improved cotton picking machine which avoids the disadvantages and shortcomings of the prior art outlined hereinbefore, and wherein neither the spindles nor the stripper parts cooperating therewith, nor any guides for angularly positioning the spindles relative to the stripper assembly require frequent replacement due to wear.

Another object of this invention is to provide an improved cotton stripping shoe which may be readily adjusted for wear compensation.

A further object of the invention is to provide an improved mechanism for positioning and maintaining the spindles in proper angular relation to a stripper comb assembly, and which mechanism is devoid of guide wheels such as have heretofore been used for direct cooperation with the spindles.

Another object is to provide an improved stripping comb assembly wherein the widths of the gaps between adjacent shoes may be quickly and accurately adjusted so that the spindles may pass through the gaps without excessive clearance which would prevent proper stripping, but with sufficient clearance to avoid excessive friction and objectionable wear.

Another object is to provide an improved mechanism which will maintain the spindles in a desired angularly adjusted relation with respect to a stationary stripping comb assembly after such adjusted relation has been effected and while the spindles are subsequently moved toward the stripping comb assembly.

These and other objects and advantages are attained by the present invention, various novel features of which will be apparent from the description herein and the accompanying drawings disclosing an embodiment of the invention, and will be more particularly pointed out in the appended claims.

Referring to the accompanying drawings:

Fig. 1 is a plan view, with parts broken away and shown in section, of the stripping and positioning mechanism of a spindle type cotton harvester;

Fig. 2 is a fragmentary side elevation, with parts broken away and shown in section, of parts shown in Fig. 1;

Fig. 3 is an enlarged fragmentary detail plan view, with parts broken away and shown in section, of parts shown in Fig. 1;

Fig. 4 is a vertical section on line IV—IV of Fig. 3, the view of Fig. 4 including portions of a chain shown in Fig. 1;

Fig. 5 is a fragmentary side elevation of one of the spindle slats incorporated in the mechanism shown in Figs. 1 and 2;

Fig. 6 is an enlarged sectional view, on line VI—VI of Fig. 2, and shows a subassembly comprising a stripper shoe and associated parts.

Fig. 7 is an enlarged top view of the stripper shoe shown in Fig. 6;

Fig. 8 is a section on line VIII—VIII of Fig. 7;

Fig. 9 is a side elevation of the stripper shoe shown in Fig. 7;

Fig. 10 is an enlarged top view of a stripper shoe spreader forming part of the subassembly shown in Fig. 6;

Fig. 11 is an end elevation of the stripper shoe spreader shown in Fig. 10;

Fig. 12 is a side elevation of the stripper shoe spreader shown in Fig. 10;

Fig. 13 is an enlarged fragmentary section on line XIII—XIII of Fig. 6; and

Fig. 14 is a fragmentary top view of a front idler sprocket and slat carrying chain subassembly associated with the mechanism shown in Figs. 1 and 2.

Referring to Figs. 1 and 2, a pair of vertically spaced driving sprockets 1 and 2 are keyed to the upper and lower ends, respectively, of a vertical drive shaft 3 which is rotatably supported in a conventional manner at the rear end of a rigid frame structure including a longitudinal top frame member 4 of Z-shaped cross section as shown in Fig. 4. A pair of vertically spaced idler sprockets 6, only one of which is shown in Fig. 14, are rotatably supported at the forward end of the frame structure, in a conventional manner, and an upper pivoted link chain or endless flexible slat carrier 7 (Fig. 1) and a lower pivoted link chain or endless flexible slat carrier 8 (Fig. 14) are trained about the rear drive sprockets 1 and 2 and the front idlers 6 for travel therearound in an oval horizontal path.

Pivotally attached to the upper and lower chains are a series of vertically extending spindle slats 9 of conventional construction, one of which is shown detached in Fig. 5. Each slat 9 comprises a slat body 10 and a series of vertically spaced picking spindles 11 which are rotatably mounted on the slat body 10 and extend horizontally from the outer end face 12 (Fig. 3) of the latter in conventional manner. At its upper and lower ends each slat 9 has a horizontally extending pocket 13, and upper and lower U-shaped hinge brackets 14 and 16 are inserted, respectively, and fixed in the upper and lower pockets 13 of each slat 9. The brackets 14 and 16 are pivotally connected to the upper and lower chains 1 and 2 by means of elongated upper and lower chain hinge pins 17 and 17', respectively, in conformity with conventional practice and as best shown in Figs. 4 and 14. In the assembled condition of the spindle slat and hinge brackets as shown in Fig. 5, a hinge pin receiving aperture 18 in the upper hinge bracket 14 is axially aligned with a corresponding hinge pin receiving aperture 18' in the lower hinge bracket 16. In the installed condition of the slat on the chains 7 and 8, a pair of axially aligned upper and lower chain hinge pins 17 and 17' are rotatable within each pair of upper and lower apertures 18 and 18', respectively, so that the slat may pivot about the common vertical axis of aligned apertures 18 and 18' and associated hinge pins 17 and 17'. Due to such pivotal mounting of the slat the picking spindles 11 may swing with the slat from their picking positions (not shown) in which they extend at right angles to the direction of chain travel, to the rearwardly inclined stripping positions in which they are shown in Fig. 1.

The chains 7 and 8 move in a generally horizontal path and in clockwise direction as indicated by the arrows A, B and C in Figs. 1, 3 and 14. As the picking unit moves through the field the cotton plants are directed into the picking tunnel (not shown) where the rotating spindles 11 come into contact with and pick the bolls of cotton.

Referring to Figs. 1 and 3, the slats 9 in passing around drive sprockets 1 and 2 become subject to centrifugal force and as a result the slats swing about their pivotal connections with the upper and lower chains 7 and 8 into centrifugally adjusted positions such as the one which is indicated in Fig. 3 at 9'.

As the slats move forward from the centrifugally adjusted position indicated at 9' in Fig. 3, they must be decelerated and tilted backward about their pivot connections with the chains 7 and 8 in order to move them to the rearwardly inclined stripping position in which they are shown at the straight run of the chain 7 in Fig. 1 and as indicated at 9 in Fig. 3. In order to effect such backward tilting of the slats 9, a slat retarding means or bumper element in the form of a rotatable slat holdback disc 21 is adjustably mounted on the rear end of the longitudinal frame member 4 in proximity to the upper drive sprocket 1, that is, at the rear end of the oval path of slat movement rearwardly of the stripping device 46. As shown in Figs. 1 and 4, a bracket plate 22 is rigidly secured to frame member 4 by a pair of stud bolts 25 and has a slotted aperture 24 which extends transversely of the frame member 4. A vertical shaft 26 is secured at its upper end within the slotted aperture 24 of the bracket plate 22 by releasable fastening means including a nut 27. Loosening of the nut 27 releases the shaft 26 for back and forth adjustment longitudinally of the slotted aperture 24, and by tightening the nut 27 the shaft 26 together with the rotatable disc 21 may be secured in any selected position of adjustment transversely of the frame member 4.

As the moving spindle slats 9 pass around the drive sprockets 1 and 2 a leading edge portion 28 (Fig. 3) of each slat body 10 above the uppermost picking spindle 11 (Figs. 4 and 5) contacts the peripheral edge or surface portion 29 of the decelerating member or holdback disc 21. The forward pull of the chains 7 and 8 combined with the retarding contact of the slat bodies 10 with the holdback disc 21 causes the spindle slats 9 to pivot rearwardly about the axes of the slat hinge pins 17 and 17'. When the spindle slat 9 becomes rearwardly inclined sufficiently, the upper part of the slat body will clear the holdback disc 21. Continued forward movement of the rearwardly inclined slat 9 will carry the uppermost picking spindle past the underside of the disc without touching it. Loosening of nut 27 will allow the holdback disc 21 to slide transversely toward or away from the adjacent passing spindle slats. Positioning the slat holdback disc 21 closer to the passing spindle slats 9 causes each slat to pivot backward about the common axis of the slat hinge pins 17 and 17' a greater number of degrees, thus increasing the angle of rearward inclination before the slats 9 will be allowed to clear the holdback disc 21. Similarly, the angle may be decreased by positioning the slat holdback disc 21 at an increased distance from the adjacent passing spindle slats, thus allowing the spindle slats to pass after they have reclined to a lesser degree than shown in Figs. 1 and 3.

As best shown in Figs. 1 and 4, an elongated U-shaped holdback guide or slat position retaining means 31 is located forwardly of the holdback disc 21 in a horizontal position so as to straddle the uppermost row of picking spindles 11. The slat guide means 31 is mounted so that its legs 32 and 33 are positioned in upper and lower spaced horizontal planes. The rearward portion of the upper leg 32 of the holdback guide 31 contains a transverse slot 34, which is best shown in Fig. 3, and the longitudinally extending frame member 4 contains an aperture 36 located just forwardly of the holdback disc 21. The transverse slot 34 in the holdback guide 31 is placed in alignment with the aperture 36 in the frame member 4, and a bolt 37 is passed therethrough and nut 38 is tightened, thus adjustably securing the holdback guide 31 to the frame member 4. The forward end of the holdback guide 31 is adjustably secured to frame member 4 in a similar manner (not shown). The lower leg 33 of the slat holdback guide 31 has a downwardly bent flange portion 39 for mounting a rail 43 of rectangular cross section, as shown in Figs. 1 and 4. The flange 39 has four longitudinally spaced apertures 41 and four screws 42 (Fig. 2) extending through these apertures and into the rail 43 for securing the latter on the flange portion 39 in an operative position opposite to the portion of the oval path of slat travel on which the reclined slats and spindles thereon travel forwardly, as shown in Fig. 1.

In the installed condition of the holdback guide 31, as shown in Figs. 1 and 4, its upper and lower legs 32 and 33 straddle the top row of rearwardly inclined picking spindles 11, and the rail 43 is so positioned as to bear horizontally against the reclined slat bodies at portions of the latter between the uppermost row of picking spindles and the next underlying row of picking spindles. The rail 43 may be positioned closer or farther away from the passing spindle slats 9 upon loosening bolts 37. After the guide has been moved to any selected position of horizontal adjustment transversely of the frame member 4, the bolts 37 may be tightened to secure the guide 31 including the rail 43 in adjusted position.

In operation, the spindle slats 9 move in endless succession against the decelerating holdback disc 21, and then in rearwardly inclined positions out of contact with the latter. Continued forward movement of the rearwardly inclined slats brings a forward beveled surface 44 (Fig. 3) of each slat body 10 into contact with the rail 43 so that the rearward inclination of the slats which has been achieved by the action of the holdback disc 21 will be maintained during forward movement of the slats through the space between the holdback disc 21 and a spindle stripping device which will presently be described. The holdback guide 31 may be adjusted, as described above, to maintain the proper angular displacement of the spindle slats 9 achieved by the action of the holdback disc.

From the foregoing description it will be apparent that the slat holdback disc 21 and the U-shaped slat guide 31 contact the slats 9 independently of the spindles 11 and in different horizontal planes. That is, the horizontal plane in which the slats 9 contact the guide 31 is offset downwardly from the horizontal plane in which the slats contact the holdback disc 21. The vertical spacing of these planes of contact avoids objectionable concentration of wear at one point on the slat. No direct contact, and consequently no wear, occurs between the spindles and the holdback disc 21, or between the spindles and the guide 31.

A stripping device best appearing in Figs. 1, 2 and 6 is generally designated by the reference character 46 and is mounted on the picker frame in forwardly spaced relation to the holdback disc 21 and just forwardly of the holdback guide 31. The stripping device 46 comprises a series of vertically spaced elongated stripper shoe assemblies 47 which, as best seen in Figs. 1 and 6, extend in an obliquely outward and forward direction relative to the portion of the oval path of slat travel on which the slats and spindles are moving forward relative to the picker frame. Each stripper shoe assembly 47 includes a stripper shoe 48 in the form of an elongated channel member having a pair of longitudinally extending stripping edges 52 formed at the free end portions, respectively, of its flanges 51. The flanges extend from the web portion 49 of the channel member in diverging relation to each other so that the bottom or web portion 49 of the channel has a width, transversely between said flanges, narrower than the width of said channel member between the stripping edges 52.

Referring to Figs. 6, it will be seen that stripper shoe 48 is attached to a horizontal bracket or support member 58 by means of two bolts 59 which pass through apertures 61 in an anchor plate 53 and through registering apertures 62 and 63 in the web 49 of the stripper shoe and associated bracket 58, respectively, with said web 49 interposed between said bracket 58 and said stripper shoe anchor plate 53. The brackets 58 extend horizontally and are vertically spaced on a channel shaped post member 64 which forms part of the rigid frame structure of the picking unit and which includes the longitudinal frame member 4. Each bracket 58 is fixedly mounted on said post 64 by means of bolts 66 and nuts 67 which pass through apertures in side flanges of the post 64 and in a vertical web of the respective bracket 58. Inserted between post 64 and brackets 58 and fixedly supported thereby is a vertically extending curved cotton deflector mounting shield 68.

The channel shaped stripper shoes contain an adjustable wedge means or spreader plate 54 (Figs. 10, 11 and 12) which is cooperable with the diverging inner side surfaces 50 of flanges 51 for resiliently deflecting the channel member 48 to different conditions of transverse spacing between the stripping edges 52. The spreader plate or member 54 is positioned in the channel shaped stripping shoe 48 so as to have its longitudinal edges in load transmitting engagement, respectively, with the diverging inner surfaces of the flanges 51. Adjustable load transmitting means in the form of bolts 57 are passed through spreader plate 54 and resiliently compressible elements or springs 56 and threaded into tapped apertures 71 contained in anchor plate 53.

Referring to Figs. 8 and 9, it will be seen that the pair of flanges 51 merging with the web portion 49 extend longitudinally beyond the latter at one end of the channel member, the flanges being bent inwardly into overlapping relation with each other at one end of the channel member. The overlapping flanges 51 form a nose portion 72 on each stripping shoe and serve to pilot the spindles into gaps 73 between relatively adjacent pairs of stripper shoes and they also allow the side portions 51 of the stripper shoe 48 to flex toward or away from each other when appropriate force is applied to the stripper shoe spreader plate 54. The tightening of spreader plate bolts or screw means 57 forces the spreader plate 54 deeper into the channel shaped stripper shoe thereby spreading the flanges 51 of the shoe apart and consequently closer to the adjacent shoes. On the other hand, loosening of the spreader plate bolts 57 permits compression springs 56 to move the spreader plate 54 transversely of the shoe in an outward direction with the result that the flanges 51 of the stripper shoe 48 move toward each other, thereby widening the gap 73 between adjacent stripper shoes 48.

Referring to Fig. 2, it will be seen that the spreading and contracting action of the flanges 51 achieved by tightening or loosening spreader plate bolts 57 will allow adjustment of the opposed stripping edges 52 of adjacent stripper shoes 48, thereby regulating the width of the spindle passage gap 73 between spaced stripping shoes 48.

As disclosed in Figs. 1 and 2, the spindles enter the stripping device 46 immediately after the slats 9 lose contact with the rail 43 of the U-shaped holdback guide 31. The oppositely facing flanges 51 of the stripper shoes 48 are adjusted by means of spreader plates 54 and bolts 57 so that the vertical height of each gap 73 between relatively adjacent stripping edges 52 is just sufficient to afford running clearance for the spindles 11 as they enter and pass through the spaced spindles passage gaps 73. The angularly inclined spindles 11 are drawn between the stripping edges 52 of the adjacent stripper shoes 48 and the coaction between the stripping shoes and the forward traveling angularly disposed spindles 11 causes the cotton to be stripped from each spindle as it passes through the respective stripping spindle passage gap 73.

The end of each spreader plate 54 is provided with an upturned end or cotton deflecting portion 74. This deflecting portion 74 coacts with cotton deflector 76 (Fig. 6), fixedly mounted by means of bolt 77 and nut 78 upon the curved deflector mounting shield 68, to direct the stripped cotton into pockets formed by members attached to an endless belt type elevating conveyer generally indicated at 79 in Fig. 1.

Some of the characterizing features of the present invention are applicable to the construction and operation of apparatus different from that disclosed herein for purposes of illustration and, therefore, it is to be understood that it is not desired to limit the invention to the particular features and details described above and that the invention is to be considered as including such other forms and modifications as are fairly embraced within the scope of the appended claims.

It is claimed and desired to secure by Letters Patent:

1. For use in a harvester of the type including one or more cotton picking spindles and stripping devices operative to strip picked cotton from said spindles upon effecting a relative movement of the devices and spindles; an improved stripping device comprising an elongated member having a channel shaped transverse cross section, said member being attached to the harvester and having spreadable side walls presenting a pair of generally parallel outer stripping edges positioned for the passage of adjacent spindles in contiguous relation thereto, a spreader member positioned between and in contact with said spreadable side walls of said elongated member, and means operatively associated with said elongated and spreader members for effecting a relative movement of said members operative to vary the spacing between the stripping edges presented by said side walls of said elongated member and thereby the proximity of said edges to the adjacent picking spindles.

2. For use in a cotton harvester of the type including one or more cotton picking spindles, and stripping devices operative to strip picked cotton from said spindles upon effecting relative movement of the devices and spindles; an improved stripping device comprising an elongated member having a channel shaped transverse cross section, said elongated member being attached to the harvester and having spreadable side walls presenting a pair of generally parallel outer stripping edges positioned for the passage of adjacent spindles in contiguous relation thereto, a spreader member positioned between and in contact with said spreadable side walls of said elongated member, and means operatively associated with said elongated and spreader members for effecting a relative movement of said members operative to vary the spacing between the stripping edges presented by said side walls of said elongated member and thereby the proximity of said edges to the adjacent picking spindles, said spreader member having an upturned end portion for guiding stripped cotton horizontally away from said stripping device.

3. For use in a cotton harvester of the type including one or more cotton picking spindles, and stripping devices operative to strip cotton from said spindles upon effecting relative movement of the devices and spindles; an improved stripping device comprising a resilient shoe member having a channel shaped transverse cross section, said shoe member being attached to the harvester and having spreadable side walls presenting a pair of generally parallel outer stripping edges positioned for the passage of adjacent spindles in contiguous relation thereto, a spreader member positioned between and in contact with said spreadable side walls of said shoe member, and means operatively associated with said elongated and spreader members for effecting a relative movement of said members operative to vary the spacing between the stripping edges presented by said side walls of said shoe member and thereby the proximity of said edges to the adjacent picking spindles, said means including biasing means located between said spreader element and said shoe member and tending to move said spreader element out of said shoe member thereby permitting said stripping edges to move toward each other and away from the spindles.

4. In combination in a cotton harvester of the type including one or more cotton picking spindles carried in pivoted slats traveling about a generally oval longitudinally extending track and including a plurality of stripping devices operative to strip seed cotton from one or more rows of spindles as they travel therepast, the improvement comprising a plurality of shoes mounted in vertically spaced relation on said harvester and extending diagonally rearward relative to the longitudinal axis of said harvester, each of said shoes presenting a pair of stripping edges which are positioned in vertically spaced opposed relation to stripping edges on adjoining shoes, said opposed stripping edges being spaced apart a distance at least equal to the diameter of said spindles, a slat decelerating member mounted on said harvester and having a surface portion contactable by and cooperable with each of said slats in succession independently of said spindles so as to pivot said slats as they leave a rearward portion of said oval track into oblique relation to said longitudinal axis, and a slat position retaining member mounted between said decelerating member and said vertical row of shoes in cooperative engagement with said pivoted slats independently of said spindles so as to maintain the latter in said oblique relation until said spindles move between opposed stripping edges of said shoes.

5. In a cotton harvester of the type having slats mounted on a carrier for horizontal movement in an endless path and being pivotally supported for horizontal back and forth swinging movement, and picking spindles carried by the slats, the improvement comprising spindle stripping means carried by the harvester, slat retarding means carried by the harvester rearward of said stripping means and including a disc member mounted to frictionally engage each of said slats in succession independently of said spindles thereby retarding said slats and causing the slats to pivot rearwardly and present the spindles carried thereby at a proper angle for stripping, and slat position retaining means mounted between said disc member and said stripping means and being operative to engage and hold the slats traveling therepast in the same position in which they leave said decelerating member and until the spindles contact said stripping means.

6. A cotton harvester comprising, in combination, an endless flexible slat carrier; a supporting structure mounting said carrier for travel in an oval horizontal path; a series of spindle slats mounted on said carrier for horizontal back and forth pivotal movement relative thereto about vertical axes, respectively; a vertical series of horizontally extending picking spindles rotatably mounted on each of said slats; a spindle stripping device mounted on said supporting structure in forwardly spaced relation to the rear end of said oval path and extending in an obliquely outward and forward direction relative to the portion of said oval path on which said slats and spindles thereon are moving forward; and slat retarding means mounted on said supporting structure rearwardly of said stripping device and including a bumper element disposed adjacent said carrier and presenting a surface portion in cooperative relation to said slats so as to bear against each of said slats in succession independently of said spindles at a rearward portion of said oval path and thereby cause said slats to pivot rearwardly about their respective vertical axes into reclined positions presenting said spindles at a proper angle for stripping.

7. A cotton harvester as set forth in claim 6, comprising an elongated frame member forming part of said supporting structure and extending longitudinally of said oval path at said portion of the latter on which said slats and spindles thereon are moving forward, and releasable fastening means adjustably connecting said bumper element to said frame member and operable to secure said bumper element in selected positions of horizontal adjustment transversely of said frame member.

8. A cotton harvester as set forth in claim 6, wherein a slat holdback disc forming said bumper element is rotatably mounted on said supporting structure in proximity to the rear portion of said oval path.

9. A cotton harvester comprising, in combination, an endless flexible slat carrier, a supporting structure mounting said carrier for travel in an oval horizontal path; a series of spindle slats mounted on said carrier for pivotal movement relative thereto about vertical axes, respectively; a vertical series of horizontally extending picking spindles rotatably mounted on each of said slats; a spindle stripping device mounted on said supporting structure in forwardly spaced relation to the rear end of said oval path and extending in an obliquely outward and forward direction relative to the portion of said oval path on which said slats and spindles thereon are moving forward, a slat retarding disc rotatably mounted on said supporting structure in rearwardly spaced relation to said stripping device for cooperative engagement with each of said slats in succession independently of said spindles so that said slats, while moving forwardly, will be swung about their pivot axes into rearwardly reclined positions at a point on said oval path rearwardly of said stripping device, and slat guide means mounted on said supporting structure for cooperative engagement with said reclined slats independently of said spindles in the space between said stripping device and said slat retarding means so as to maintain said slats in said inclined positions during their movement through said space.

10. A cotton harvester as set forth in claim 9 comprising an elongated U-shaped slat guide element mounted on said supporting structure in a horizontal position so as to straddle the uppermost row of picking spindles and having a longitudinally extending edge portion at the free end of its lower leg positioned for cooperative engagement with portions of said slats between said uppermost and the next underlying row of picking spindles.

11. A spindle stripper shoe for cotton pickers comprising a channel member having longitudinally extending integrally connected web and flange portions, each of said flange portions having a free end presenting a longitudinally extending stripping edge.

12. A spindle stripper shoe as set forth in claim 11 wherein said flanges extend from said web portion of said channel member in diverging relation to each other so that the bottom of said channel member has a width, transversely between said flanges, narrower than the width of said channel member between said stripping edges.

13. A spindle stripper shoe for cotton pickers comprising a channel member having a web portion and a pair of flanges having free end portions, said flanges merging with said web portion and extending longitudinally beyond the latter at one end of said channel member, said flanges being bent inwardly into overlapping relation with each other at said one end of said channel member, and each of said free end portions having a longitudinally extending stripping edge formed thereon.

14. A stripper shoe assembly for cotton pickers comprising a channel member having longitudinally extending flanges and stripping edges along the free ends, respectively, of said flanges, and means including an adjustable wedge element cooperable with said flanges for resiliently deflecting the latter to provide different conditions of transverse spacing between said stripping edges.

15. A stripper shoe assembly for cotton pickers comprising a channel member having a web portion and a pair of flanges merging with said web portion and each having a free end presenting a longitudinally extending stripping edge, said flanges extending from said web portion in diverging relation to each other so that the bottom of said channel member has a width, transversely between said flanges, narrower than the width of said channel member between said free ends of said flanges, a spreader plate having longitudinal edges in load transmitting engagement, respectively, with the diverging inner surfaces of said flanges, and adjustable load transmitting means cooperable with said spreader plate for selectively securing the latter in different positions of adjustment toward and away from said web portion.

16. A stripper shoe assembly as set forth in claim 15 wherein said adjustable load transmitting means include at least one resiliently compressible element operatively interposed between said web portion of said channel member and said spreader plate, and screw means mounted for cooperation with said spreader plate for urging the latter toward said web portion against the action of said resiliently compressible element.

17. A stripper shoe assembly as set forth in claim 15 wherein said spreader plate has an end portion extending obliquely outward from and beyond said channel member at one end of the latter.

18. A spindle stripping device for cotton pickers comprising, in combination, a support, a series of channel members each including a web and a pair of spaced flanges having free end portions, and each of said flanges having a stripping edge along said free end portion thereof, fastening means cooperable with the webs of said channel members and with said support for detachably securing said channel members in spaced, parallel relation to each other, and adjustable wedge means operatively associated respectively, with said spaced flanges for resiliently deflecting the latter individually and selectively to provide different positions of transverse spacing between their stripping edges.

19. A spindle stripping device as set forth in claim 18, wherein said channel members are narrower at their bottoms than between their stripping edges, and wherein said adjustable wedge means comprise spreader plates positioned, respectively, within said channel members in cooperative engagement with said flanges of the latter, and screw means operatively connected with said support and in load transmitting engagement with said spreader plates.

20. In a cotton harvester of the type wherein a series of stripper elements are mounted on a vertical series of stationary supporting brackets, respectively, and are spaced apart to provide horizontal spindle stripping gaps between relatively adjacent pairs of said stripper elements; the combination, with each of said supporting brackets, of a channel member having a longitudinally extending, vertically disposed web portion and a pair of longitudinally extending flanges merging with said web portion, said channel member presenting a pair of vertically spaced longitudinally extending stripping edges along the free ends, respectively, of said flanges; fastening means rigidly securing said web portion to the associated supporting bracket, and spreader means mounted in the space between said flanges and cooperable with said flanges at the inner sides, respectively, of the latter for resiliently deflecting said flanges relative to said web portion to different conditions of transverse spacing between said stripping edges.

21. A stripper shoe assembly for cotton pickers comprising, in combination, a channel member having a longitudinally extending web portion and a pair of longitudinally extending flanges merging with said web portion, said channel member presenting a pair of transversely spaced, longitudinally extending stripping edges along the free ends, respectively, of said flanges; and spreader means for resiliently deflecting said flanges relative to said web portion to different conditions of transverse spacing between said stripping edges, said spreader means comprising an anchor plate secured to said web portion, and thrust transmitting means bearing upon the inner sides of said flanges and operatively connected with said anchor plate in adjustable relation to the latter.

References Cited in the file of this patent
UNITED STATES PATENTS

| | | |
|---|---|---|
| 2,058,513 | Rust et al. | Oct. 27, 1936 |
| 2,200,303 | Rust | May 14, 1940 |
| 2,458,531 | Rust | Jan. 11, 1949 |
| 2,505,143 | Rust | Apr. 25, 1950 |
| 2,577,367 | Rust | Dec. 4, 1951 |
| 2,629,221 | Rust | Feb. 24, 1953 |